(12) United States Patent
McGunn et al.

(10) Patent No.: US 6,786,009 B1
(45) Date of Patent: Sep. 7, 2004

(54) KIT FOR SECURABLE ENCLOSURE

(75) Inventors: Edward J. McGunn, Chicago, IL (US); Lori R. Hollis, Chicago, IL (US)

(73) Assignee: Corporate Safe Specialists, Posen, IL (US)

( * ) Notice: Subject to any disclaimer, the term of this patent is extended or adjusted under 35 U.S.C. 154(b) by 312 days.

(21) Appl. No.: 09/639,535

(22) Filed: Aug. 16, 2000

(51) Int. Cl.[7] .............................................. E04H 1/00
(52) U.S. Cl. ...................... 52/36.2; 52/79.9; 52/285.1; 312/263
(58) Field of Search ................. 52/36.2, 79.5, 52/79.9, 79.12, 127.7, 285.1; 403/321, 322.1, 322.3, 322.4, 325; 109/79, 78, 51; 312/264, 265, 100, 111, 321

(56) References Cited

U.S. PATENT DOCUMENTS

| | | | |
|---|---|---|---|
| 95,504 A | * 10/1869 | Murray et al. ................ | 403/11 |
| 405,562 A | 6/1889 | King | |
| 676,509 A | * 6/1901 | McNown .................... | 312/263 |
| 713,871 A | 11/1902 | Goehler | |
| 1,094,773 A | * 4/1914 | Beehler ..................... | 292/127 |
| 2,793,401 A | * 5/1957 | Paschke ...................... | 52/264 |
| 2,853,751 A | 9/1958 | Schlueter | |
| 2,853,752 A | * 9/1958 | Schlueter .................... | 109/79 |
| 3,018,017 A | * 1/1962 | Hill ............................ | 220/326 |
| 3,146,011 A | * 8/1964 | Seevers ..................... | 292/247 |
| 3,392,497 A | 7/1968 | Cushman | |
| 3,679,280 A | * 7/1972 | Friederich et al. ............. | 312/6 |
| 4,098,199 A | 7/1978 | Haje | |
| 4,158,338 A | 6/1979 | Dippold et al. | |
| 4,266,386 A | * 5/1981 | Bains ........................ | 52/481.2 |
| 4,426,935 A | * 1/1984 | Nikoden, Jr. ................ | 109/79 |
| 4,796,392 A | 1/1989 | Graham, Jr. | |
| RE33,263 E | 7/1990 | Goodman | |
| 5,212,924 A | 5/1993 | Finkelstein | |
| 5,386,788 A | 2/1995 | Linker et al. | |
| 5,669,495 A | 9/1997 | West | |
| 5,724,774 A | * 3/1998 | Rooney ...................... | 52/79.5 |
| 5,960,592 A | * 10/1999 | Lilienthal, II et al. ........ | 52/79.1 |
| 6,099,197 A | * 8/2000 | Gauron ....................... | 403/325 |
| 6,120,206 A | * 9/2000 | Benner et al. .............. | 403/231 |
| 6,286,269 B1 | * 9/2001 | Marcum ..................... | 52/79.5 |

FOREIGN PATENT DOCUMENTS

| | | | | |
|---|---|---|---|---|
| DE | 41 27 893 A1 | * 2/1993 | ................... | 109/79 |
| WO | WO 91/05128 | * 4/1991 | ................... | 109/79 |

* cited by examiner

Primary Examiner—Lanna Mai
(74) Attorney, Agent, or Firm—Wood, Phillips, Katz, Clark & Mortimer

(57) ABSTRACT

A kit for a securable enclosure having a front opening. The kit is placeable selectively in an assembled state and a disassembled state. The kit includes a top panel, first and second side panels, a rear panel, and first and second connector parts. The top panel, first and second panels, and rear panel are connected to each other to bound a storage space accessible through the front opening. The first connector part is fixedly attached to one of the top panel, first side panel, second side panel, and rear panel. The second connector part is fixedly attached to another one of the top panel, first side panel, second side panel, and rear panel. The first and second connector parts are connectable, each to the other, without any additional separate parts, to maintain the one and the another of the top panel, first side panel, second side panel, and rear panel, together with the kit in the assembled state.

17 Claims, 8 Drawing Sheets

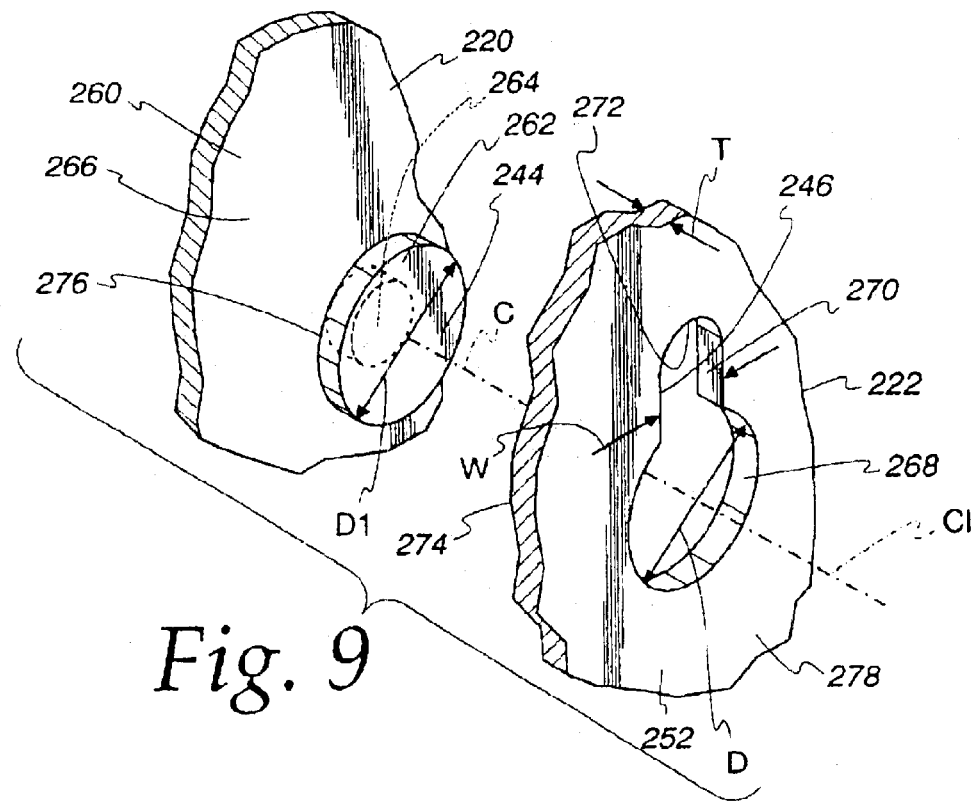
Fig. 9
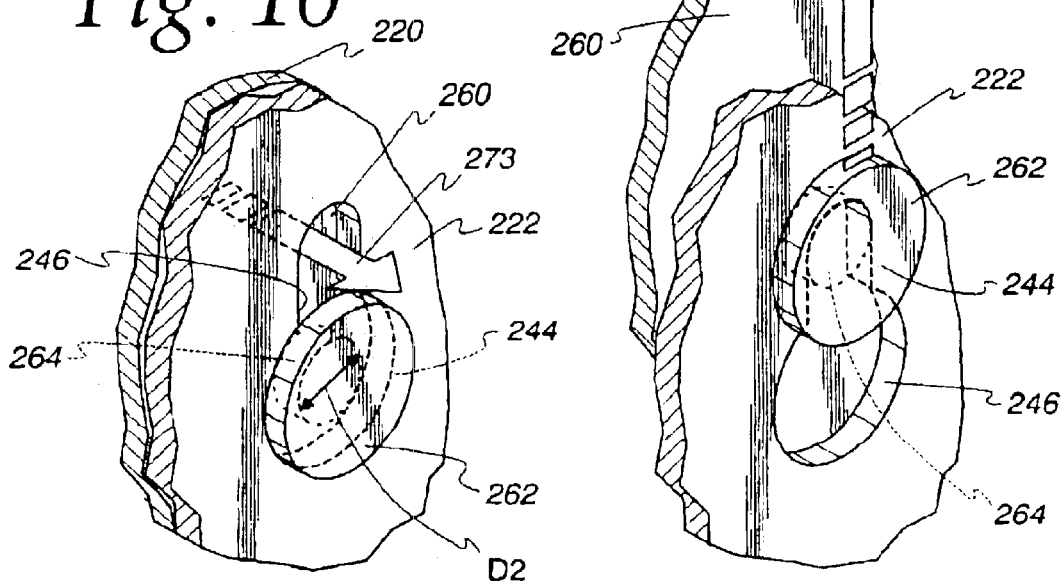
Fig. 10
Fig. 11

KIT FOR SECURABLE ENCLOSURE

FIELD OF THE INVENTION

This invention relates to enclosures, as for storing objects, and, more particularly, to a kit with components that can be assembled to define the enclosure.

BACKGROUND ART

It is known to construct enclosures from joinable panels as to facilitate the storage of valuable items, such as jewelry, clothing, guns, etc. This type of enclosure is commonly made from metal, for purposes of security. A removable closure element can be secured in a closed state by a key- or combination-type lock system. For purposes of structural integrity and security, the panels are commonly permanently joined together at the point of manufacture.

Aside from the fact that the manufacturing process may be relatively time consuming and expensive, the pre-assembly requires that the enclosure be shipped in an assembled state. The assembled enclosure may occupy a substantially greater volume than it does in a disassmbled state, which potentially increases space requirements, for purposes of display and inventorying, and costs associated with shipping.

SUMMARY OF THE INVENTION

In one form, the invention is directed to a kit for a securable enclosure having a front opening. The kit is placeable selectively in an assembled state and a disassembled state. The kit includes a top panel, first and second side panels, a rear panel, and first and second connector parts. The top panel, first and second side panels, and rear panel are connected to each other to bound a storage space accessible through the front opening. The first connector part is fixedly attached to one of the top panel, first side panel, second side panel, and rear panel. The second connector part is fixedly attached to another one of the top panel, first side panel, second side panel, and rear panel. The first and second connector parts are connectable, each to the other, without any additional separate parts, to releasably maintain the one and the another of the top panel, first side panel, second side panel, and rear panel, together with the kit in the assembled state.

In one form, the first connector part has a clip body and the second connector part has a repositionable lock hook that is releasably connectable to the clip body.

In one form, the lock hook is accessible only through the front opening with the kit in the assembled state.

In one form, the top panel is releasably connectable to each of the first and second side panels and rear panel through releasable, cooperating connector parts. One of the releasable, cooperating connector parts is fixedly attached to one of the top panel, first side panel, second side panel, and rear panel. Another of the cooperating connector parts is fixed to another of the top panel, first side panel, second side panel, and rear panel. The releasable, cooperating connector parts are connectable, each to the other, without any additional separate parts.

In one form, the kit further includes a front frame panel for a closure element. The front frame panel is releasably connectable to at least one of the top panel, first side panel, and second side panel through releasable, cooperating connector parts. One of the releasable, cooperating connector parts is fixedly attached to one of the front frame panel, top panel, first side panel, and second side panel. Another of the releasable cooperating connector parts is fixedly attached to another of the front frame panel, top panel, first side panel, and second side panel. The releasable cooperating connector parts are connectable, each to the other, without any additional separate parts.

The kit may further include a closure element that is mounted to the front frame panel for movement between a) an open position wherein the storage space can be accessed through the front opening and b) a closed position.

In one form, with the closure element in the closed position, the cooperating connector parts cannot be accessed from outside of the storage space.

The kit may further include a bottom panel which is releasably connected to at least one of the first side panel, second side panel, and rear panel.

The bottom panel may be releasably connected to the at least one of the first side panel, second side panel, and rear panel through releasable cooperating connector parts with one of the cooperating connector parts being attached to the bottom panel and another of the connector parts being attached to the at least one of the first side panel, second side panel and rear panel.

The kit may further include a reinforcing rod that extends between the top panel and the bottom panel. The reinforcing rod is spaced from each of the first and second side panels and the rear panel.

In one form, one of the top panel, first side panel, second side panel, and rear panel has a substantially flat, first surface and a first flange with a flat surface that is angularly disposed to the first surface. The another of the top panel, first side panel, second side panel, and rear panel has a substantially flat second surface and a second flange with a flat surface that is angularly disposed to the second surface. With the kit in the assembled state, the flat surface on the first flange is facially abutted to the flat surface on the second flange.

The first surface may be substantially orthogonal to the second surface.

The first and second connector parts may biasably draw the flat surfaces on the first and second flanges against each other.

The first and second flanges may each have an opening therethrough to accommodate the first and second connector parts.

The first and second connector parts may be releasably biasably held connected to each other.

In one form, the first and second connector parts define a connector assembly. The kit includes a plurality of connector assemblies including at least one connector assembly that acts between each of a) the top panel and at least one of the first side panel, second side panel, and rear panel, b) the first side panel and at least one of the top panel and rear panel, c) the second side panel and at least one of the top panel and the rear panel, and d) the rear panel and at least one of the top panel, the first side panel, and the second side panel.

In one form, the plurality of connector assemblies maintain the top panel, first and second side panels, and rear panel together with the kit in the assembled state without any separate fasteners.

In one form, a first of the top panel, first side panel, second side panel, and rear panel has a locating post thereon, and another of the top panel, first side panel, second side panel, and rear panel has a locating slot thereon to receive the locating post with the kit in the assembled state.

In one form, the locating post is fixed on the first panel.

In one form, the locating post includes a neck with an enlarged head thereon. The enlarged head is movable into the locating slot by moving the first panel in a first direction in a first line with the first and another panel in a first relative position. The slot is configured so that with the enlarged head moved through the slot, shifting of the first panel relative to the another panel transversely to the first line to a second relative position causes the enlarged head to act against the another panel to thereby block movement of the enlarged head out of the slot by movement of the first panel parallel to the first line oppositely to the first direction.

In one form, the kit further has a third connector part on the first panel and a fourth connector part on the another panel, with the third and fourth connector parts being releasably connectable, each to the other, to maintain the first and another panels in the second relative position.

The invention is also directed to a kit for a securable enclosure having a front opening. The kit is placeable selectively in an assembled state and a disassembled state. The kit has a plurality of panels that are connected together to bound a storage space accessible through the front opening, a first connector part fixedly attached to one of the panels, and a second connector part fixedly attached to another one of the panels. The first and second connector parts are connectable, each to the other, without any additional separate parts to releasably maintain the one and the another panels together with the kit in the assembled state.

The connection between the first and second connector parts may be releasable.

In one form, the one and the another of the panels have surfaces that are flat and substantially orthogonal to each other.

In one form, the one panel has a first flange with a flat surface that is angularly disposed to the surface on the one panel. The another panel has a second flange with a flat surface that is angularly disposed to the surface on the another panel. With the kit in the assembled state, the flat surfaces on the first and second flanges are facially abutted to each other.

The first connector part may include a clip body, with the second connector part including a repositionable lock hook that is releasably connectable to the clip body.

The first and second connector parts may be releasably, biasably held connected to each other.

In one form, a first of the panels has a locating post thereon and another of the panels has a locating slot thereon to receive the locating post with the kit in the assembled state.

In one form, the locating post is fixed on the first panel.

In one form, the locating post includes a neck with an enlarged head on the neck. The enlarged head is movable into the locating slot by moving the first panel in a first direction in a first line with the first and another panel in a first relative position. The slot is configured so that with the enlarged head moved through the slot, shifting of the first panel relative to the another panel transverse to the first line to a second relative position causes the enlarged head to act against the another panel to thereby block movement of the enlarged head out of the slot by movement of the first panel parallel to the first line oppositely to the first direction.

BRIEF DESCRIPTION OF THE DRAWINGS

FIG. 9 is an enlarged, fragmentary, perspective view of a cooperating locating post and locating slot on adjacent, joined panels, with the panels in a first relative position;

FIG. 10 is a view as in FIG. 9 with the panels moved relative to each other to advance the locating post into the locating slot;

FIG. 11 is a view as in FIGS. 9 and 10 with the panels relatively shifted to a second relative position to lock the joined panels together;

DETAILED DESCRIPTION OF THE DRAWINGS

Figure 1:
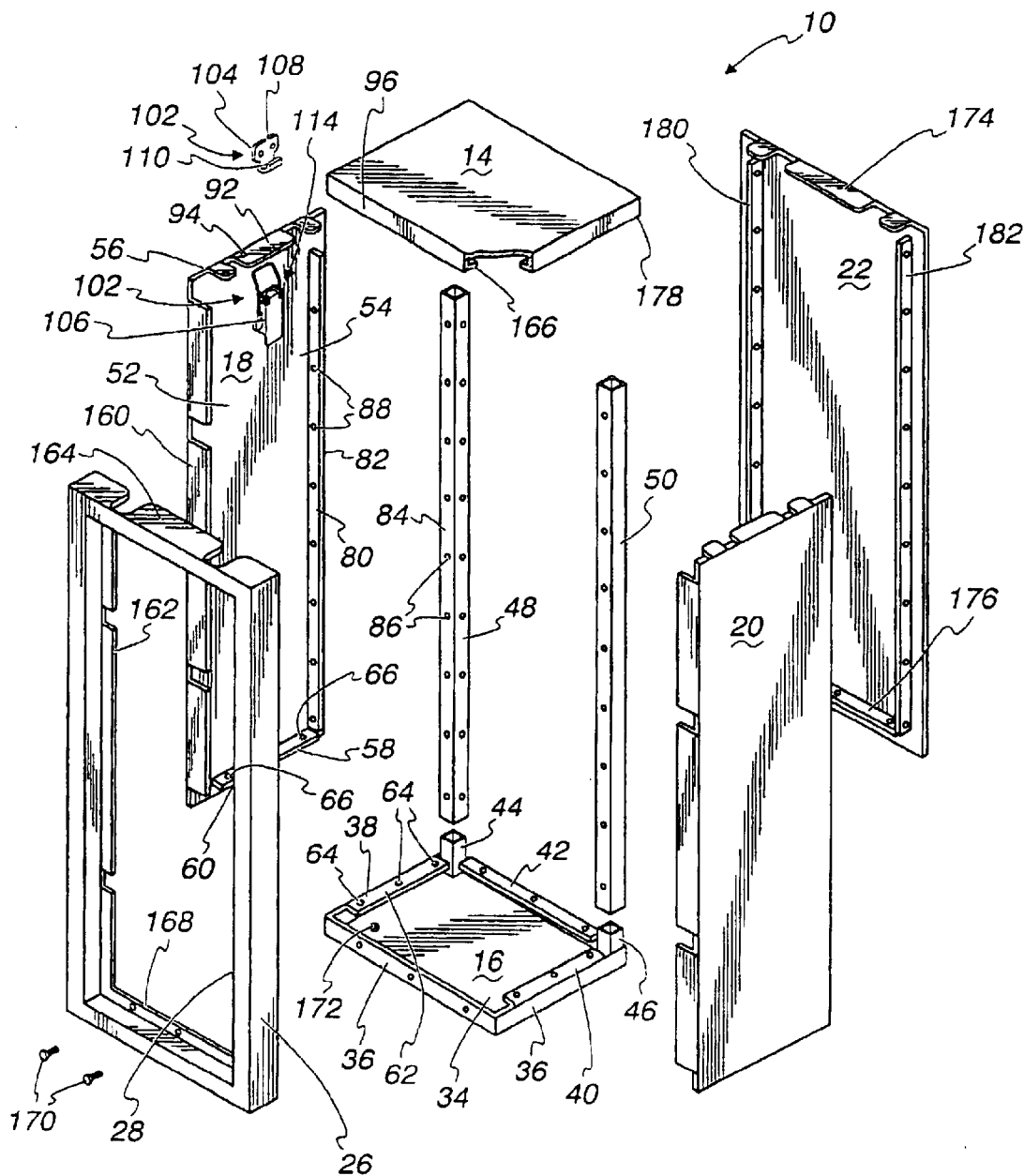
FIG. 1 is an exploded perspective view of a kit for a securable enclosure, according to the present invention, including panels which are separably connected to each other to bound a storage space.
Figure 2:
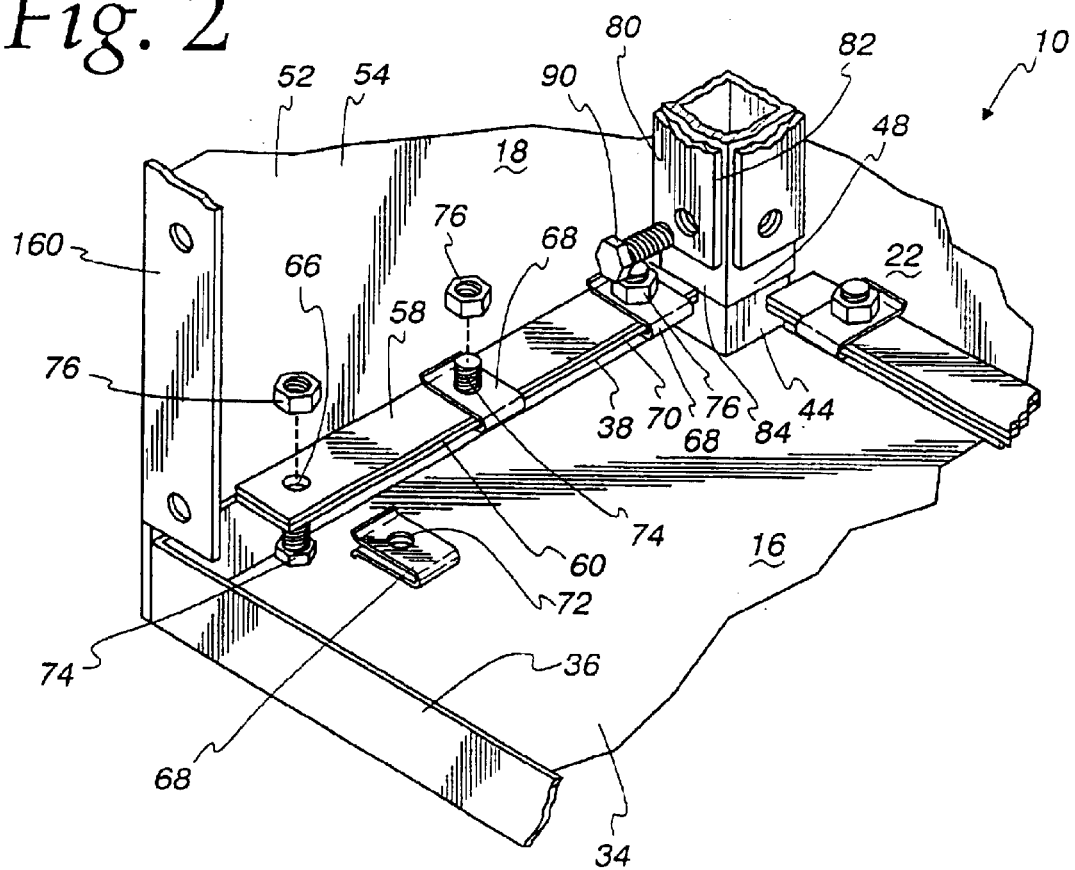
FIG. 2 is an enlarged, fragmentary, perspective view showing the connection between bottom, side and rear panels.
Figure 3:
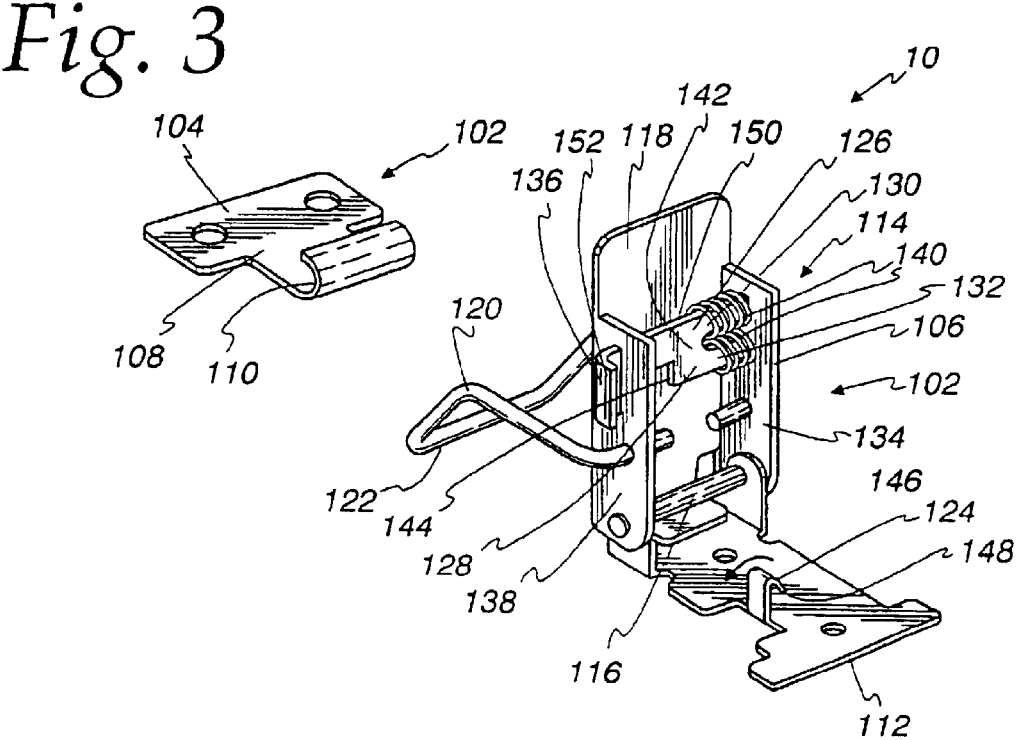
FIG. 3 is an enlarged, fragmentary, perspective view of first and second connector parts which are releasably connectable, each to the other, to maintain adjacent panels in assembled relationship.
Figure 4:
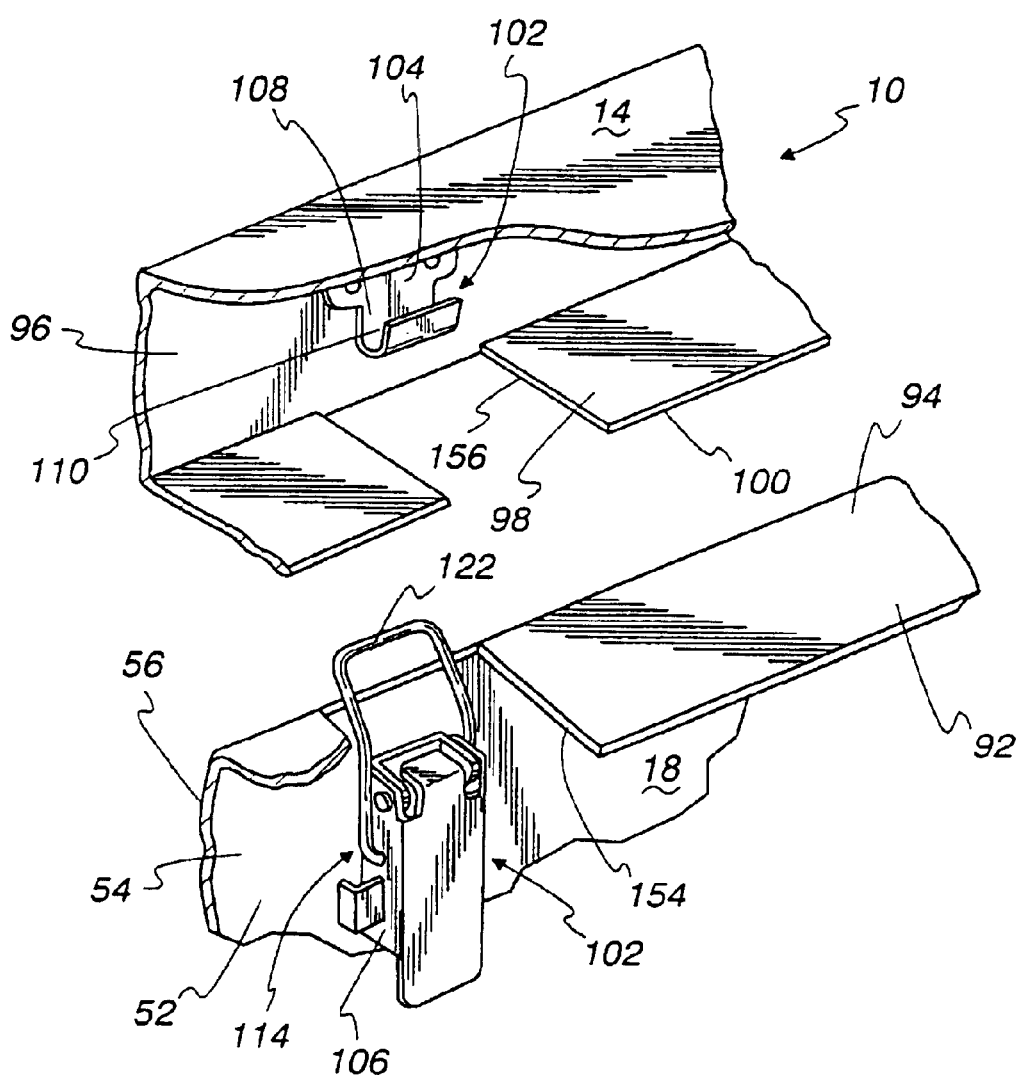
FIG. 4 is an enlarged, fragmentary, perspective view of the connector parts in FIG. 3 fixedly attached to adjacent panels which are connected through the first and second connector parts.
Figure 5:
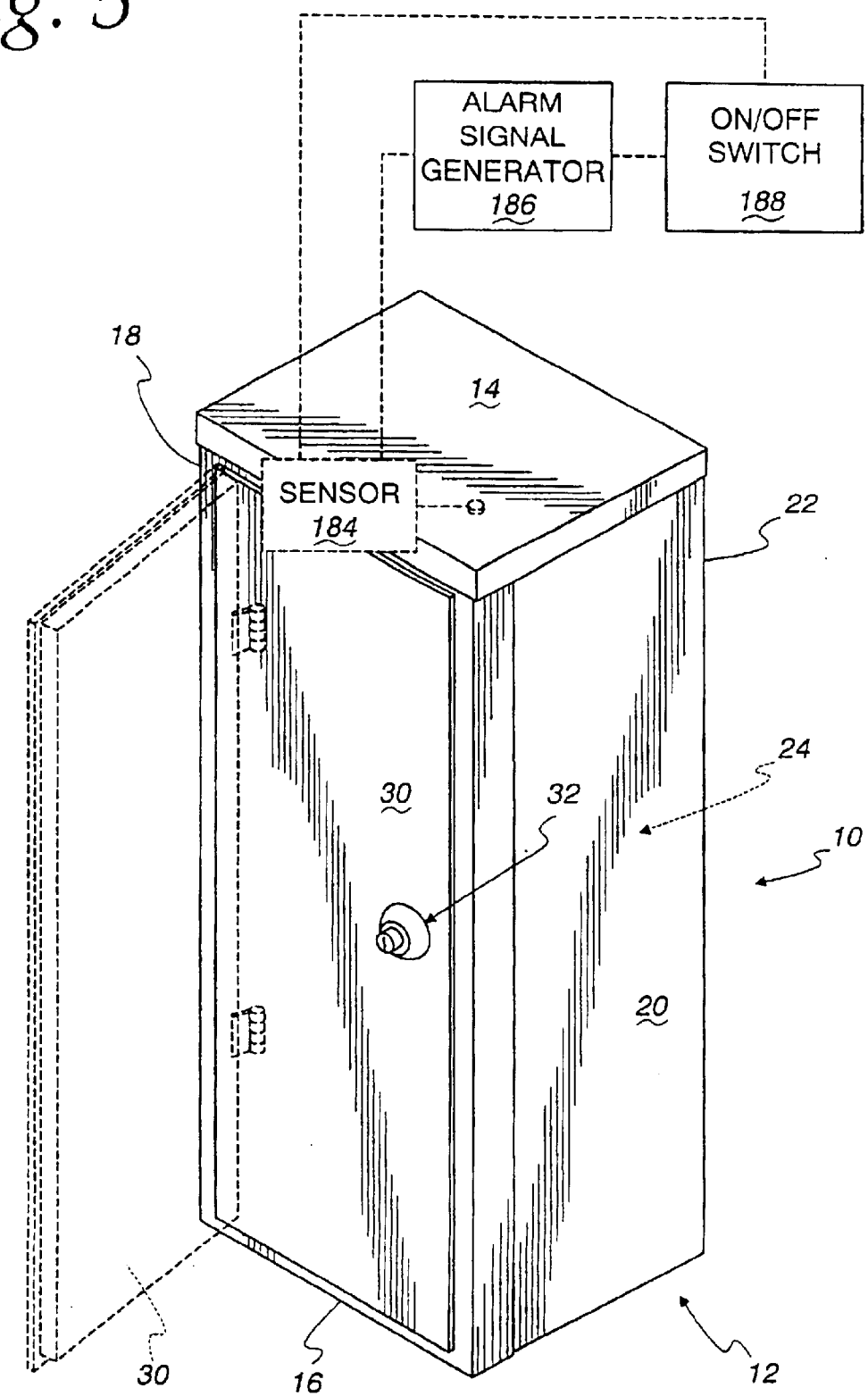
FIG. 5 is a perspective view of the kit of FIG. 1 in an assembled state.

Referring initially to FIGS. 1–5, a kit, according to the present invention, is shown at 10 for constructing a securable enclosure, as shown at 12 in FIG. 5 in an assembled state. The enclosure 12, having the configuration shown, is particularly suitable for storing valuables, such as guns, or the like. The configuration of the enclosure 12 could vary considerably from that shown without departing from the invention.

The kit 10 consists of a plurality of panels, and in this case six panels: a top panel 14; a bottom panel 16; side panels 18, 20; and a rear panel 22. According to the invention, the panels 14, 16, 18, 20, 22 are separably connected to each other to cooperatively bound a storage space 24.

The kit 10 further includes a rectangular front frame panel 26 having a front access opening 28. A closure element 30 is mounted to the front frame panel 26 for movement between an open position, as shown in phantom lines wherein the storage space 24 can be accessed through the front opening 28, and a closed position, as shown in solid lines in FIG. 5. A lock assembly 32, which may be key operated or operated through a combination mechanism, releasably maintains the closure element 30 in the closed condition.

The bottom panel 16 has a flat wall 34 and an upturned peripheral edge 36. The upturned peripheral edge 36 is return bent to form flanges 38, 40, 42 at the sides of the enclosure 12 and rear thereof, respectively.

Upwardly projecting stub elements 44, 46 are integrated, as by welding, to become part of the panel 16 at the rear corners thereof. The stub elements 44, 46 each mount an elongate post 48, 50, respectively. The stub elements 44, 46 and elongate posts 48, 50 have complementary cross-sectional shapes to allow the stub elements 44, 46 and elongate posts 48, 50 to be engageable, one within the other. The elongate posts 48, 50 shown have a square cross-sectional configuration and extend fully between the top and bottom panels 14, 16.

The side panel 18 has a wall 52 with flat internal and external surfaces 54, 56. The bottom of the wall 52 has a flange 58 thereon with a bottom flat surface 60 which is angularly disposed to the wall 52 so as to facially abut the flat, upwardly facing surface 62 on the bottom panel flange 38.

The flanges 38, 58 have like diameter openings 64, 66, which are alignable with each other with the side panel 18 operatively associated with the bottom panel 16. U-shaped clips 68 are placed over the free edge 70 produced by the combined flanges 38, 58 and have openings 72 alignable with the openings 64, 66 in the flanges 38, 58. With this arrangement, threaded fasteners 74, as in the form of a bolt, can be directed through the openings 64, 66, 72 and secured by nuts 76 to captively maintain the flanges 38, 58 together. In the embodiment shown, three such fasteners 74 are utilized. However, the precise number is a matter of design choice.

The side panel 18 has a vertically extending flange 80 adjacent to the rear thereof. The flange 80 has a flat, rearwardly facing surface 82 that facially abuts to a forwardly facing surface 84 on the elongate post 48. The elongate post 48 has threaded bores 86 at regular intervals along the height thereof, which match in number and location with openings 88 through the flange 80. Threaded fasteners, in the form of bolts 90, can be directed through the openings 88 and into the threaded bores 86 to maintain the flange 80 against the elongate post 48.

The upper portion of the side panel 18 is bent to define a flange 92 with an upwardly facing surface 94 that is substantially orthogonal to the surfaces 54, 56. The flange 92 is designed to seat the top panel 14. More particularly, the top panel 14 has a depending, peripheral edge 96 with a return, right angle bend which defines a flange 98 having a downwardly facing surface 100 which facially abuts to the upwardly facing surface 94 on the flange 92, with the top panel 14 and side panel 18 operatively connected.

The top panel 14 and side panel 18 are releasably maintained together by 5 connector assemblies 102, each consisting of cooperating first and second connector parts 104, 106. The first connector 104 is fixedly attached to the top panel 14 and consists of a clip body 108 defining a U-shaped seat 110.

The second connector part 106 is fixedly attached to the side panel 18 through a base element 112. The base element 112 supports a latch assembly 114 which is pivotable relative to the base element 112 about a hinge pin 116 for movement between a latched position, as shown in FIG. 4, and an unlatched position, as shown in FIG. 3. The latch assembly 114 includes a U-shaped housing 118 which is connected to the base element 112 through the hinge pin 116. A U-shaped lock hook/latch wire 120 is pivotably mounted to the housing 118. By pivoting the housing 118 from the FIG. 3 position into the FIG. 4 position, the cross bar 122 on the latch wire 120 is moved closer to the base element 112. With the cross bar 122 nested in the U-shaped seat 110, this same movement causes the cross bar 122 to draw the clip body 108 towards the base element 112. As this occurs, the surface 100 of the flange 98 on the top panel 14 is drawn biasably against the surface 94 on the flange 92 on the side panel 18.

The latch assembly 114 is biasably maintained in the latched position. This is accomplished by the interaction of a J-shaped finger 124 on the base element 112 with a holding element 126 mounted movably upon the housing 118. The holding element 126 has a U-shaped body 128 with spaced legs 130, 132 that project through one housing wall 134. The opposite end 136 of the body 128 projects through a spaced housing wall 138. Coil springs 140 surround the legs 130, 132 and exert a bias force between the housing wall 134 and a bight portion 142 at the juncture of the legs 130, 132 to normally urge the holding element 126 towards the left in FIG. 3.

The holding element has an edge 144 which engages the finger 124 and deflects the finger in the direction of the arrow 146 as the latch assembly 114 is changed from the unlatched position into the latched position. The movement of the edge 144 past the finger 124 is also facilitated by the shifting of the holding element 126 from left to right in FIG. 3 against the bias produced by the springs 140. Once a free edge 148 of the finger 124 clears the edge 144 on the holding element 126, the holding element 126 and finger 124 assume their undeformed state, which causes the finger free edge 148 to situate in a holding position behind a surface 150 on the holding element 126.

To release the latch assembly 114 from its latched position, a surface 152 defined by an offset portion at the free end 136 of the holding element 126 can be pressed from left to right in FIG. 3 to allow the holding element 126 to move past the finger free edge 148 to the unlatched position.

Openings 154, 156 are provided in the flanges 92, 98, respectively, to accommodate the latch assembly 114. The latch assembly 114 can be operated to hold the flanges 92, 98 biasably against each other without the need for any additional separate fasteners. Further, the latch assembly 114 is accessible only from the storage space 24 through the front opening 28. Thus, with the closure element 30 in the closed position, it is not possible to access the latch assembly 114 as to effect release thereof and gain unauthorized access to the storage space 24.

The front of the side panel 18 is formed to define a flange 160. The flange 160 cooperates with a flange 162 on the front frame panel 26. The flange 162 is formed on the front frame panel 26 in the same manner that the flange 98 is formed on the top panel 14. Latch assembles 114 cooperate between the side panel 18 and front frame panel 26, in the same manner previously described, to maintain the flanges 160,162 biasably against each other to thereby maintain the side panel 18 and front frame panel 26 in operative relationship.

The side panel 20 is assembled to the front frame panel 26, bottom panel 16, elongate post 50, top panel 14, and rear panel 22 in the same manner as the side panel 18 is connected to the front frame panel 26, bottom panel 16, elongate post 48, top panel 14, and rear panel 22.

The front frame panel 26 has a top flange 164 which cooperates with a flange 166 on the top panel 14 in the same manner that the flange 92 on the side panel 18 cooperates with the flange 98 on the top panel 14. The flanges 164,166 are maintained together by latch assemblies 114.

The front frame panel 26 has a bottom flange 168 that is held against the upturned peripheral edge 36 on the bottom panel 16 through threaded fasteners, in this case a bolt 170 and cooperating nut 172.

The rear panel 22 has an upper flange 174 and a lower flange 176. The upper flange 174 cooperates with a flange 178 on the top panel 14 in the same manner that the flange 92 on the side panel 18 cooperates with the flange 98 on the top panel 14. Latch assemblies 114 are used to maintain this connection.

The lower flange 176 cooperates with the flange 42 and the bottom panel 16 in the same manner that the flange 58 on the side panel 18 cooperates with the flange 38 on the bottom panel 16. This connection is similarly maintained by threaded fasteners.

The rear panel 22 has spaced, vertically extending flanges 180, 182 which engage and are bolted to the elongate posts 48, 50, respectively.

A preferred assembly order is as follows. The elongate posts 48, 50 are engaged with the stub elements 44, 46 on the bottom panel 16. The flange 80 on the side panel 18 is then bolted to the elongate post 48. A corresponding flange (not shown) on the side panel 20 is bolted to the elongate post 50. The flange 58 on the side panel 18 is bolted to the flange 38 with the corresponding flange (not shown) on the side panel 20 bolted to the flange 40 on the bottom wall 16. Through the latch assemblies 114, the top panel 14 is secured to each of the side panels 18, 20. The rear panel 22 is then bolted to the flange 42 on the bottom wall 16 and the elongate posts 48, 50. The latch assemblies 114 are used to secure the top panel 14 to the rear panel 22. The flange 168 on the front frame panel 26 is bolted to the peripheral edge 36 on the bottom panel 16. The other three sides of the front frame panel 26 are connected to the side panels 18, 20 and top panel 14 through the use of the latch assemblies 114. The closure element 30 can then be mounted to the front frame panel 26. Any desired finishing materials or fittings can then be applied to the enclosure 12.

A sensor 184 can be provided on the enclosure 12. The sensor 184 may detect motion, vibration, etc. as is well known in the art, and causes an alarm signal generator 186 to generate a detectable signal to indicate that the enclosure 12 has been tampered with. The alarm system may be disabled by opening of the lock assembly 32 through a key or through the appropriate combination. An on/off switch 188 may be provided to disable the alarm system including the sensor 184 and/or the alarm signal generator 186.

With the structure described above, the kit elements are held together by means which are mounted at inside corners defined by the angularly joined panels, rather than at outside corners so as to be accessible only from the storage space 24. Thus, with the closure element 30 in the closed state, Where the latch assemblies 114 are employed, there is no need for any elements separate from the connector parts 102, 104 to make and maintain a connection between panels 14, 16, 18, 20, 22.

While the invention contemplates that the kit parts may be welded together for additional security, it is possible to make a secure structure without the use of welding. This allows repeated assembly and disassembly of the kit 10. The kit 10 can be shipped in a disassembled, compacted state, to a user, with assembly taking place at the user's site.

Figure 13:
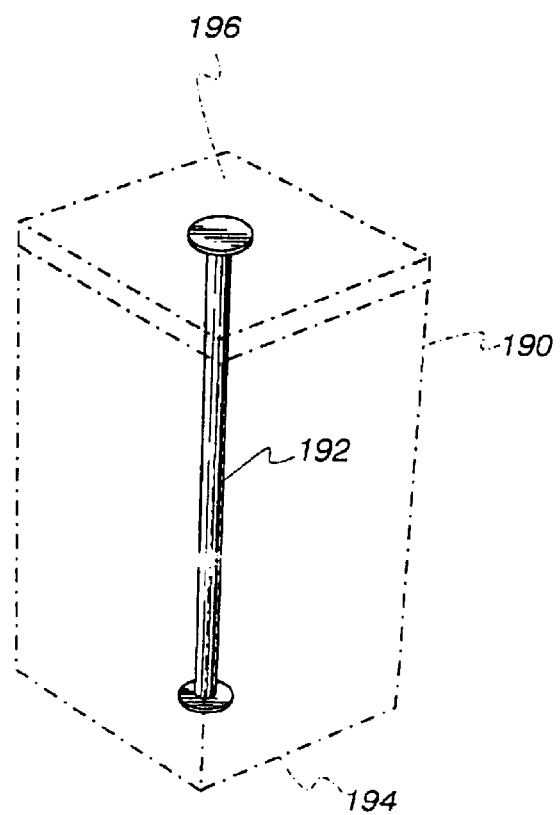
FIG. 13 is a schematic representation of an assembled kit for a securable enclosure, according to the present invention, and including a reinforcing rod extending between the top and bottom thereof.

In FIG. 13, a modification to the invention, described above, is shown. In FIG. 13, an enclosure 190, which may have the form of the enclosure 12, previously described, or a different form, is provided with a reinforcing rod 192 20 which extends between a bottom panel 194 and a top panel 196. This rigidifies the enclosure 190.

In FIGS. 6–12, a modified form of kit, according to the present invention, is shown at 210. The kit 210 can be selectively broken down and assembled into a securable enclosure, as shown at 212 in FIG. 12. The enclosure 12 is useable in the same manner as the enclosure 12.

Figure 12:
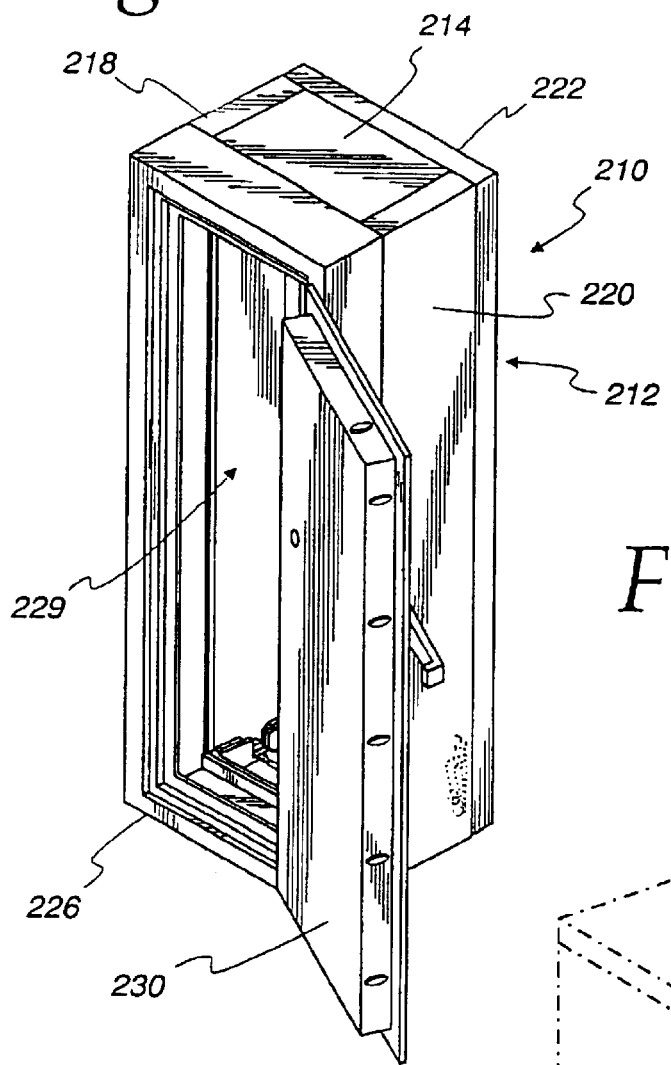
FIG. 12 is a perspective view of the kit in FIG. 6 in an assembled state.

The kit 210 consists of a plurality of panels, in this case 6 panels: a top panel 214; a bottom panel 216; side panels 218, 220; a rear panel 222; and a front frame panel 226. The front frame panel 226 defines a front access opening 228 through which an internal storage space 229, bounded by the panels 214, 216, 218, 220, 222, 226, can be accessed. A closure element 230 is mounted to the front frame panel 226 through hinges 232 for pivoting movement between an open position, as shown in FIG. 12 wherein the front access opening 228 is exposed, and a closed position, wherein the front access opening 228 is blocked by the closure element 230. A latch assembly 240 on the closure element 230 allows the closure element 230 to be releasably latched in the closed position. Through a lock mechanism 242, the closure element 230 can be locked in the closed position. The lock mechanism 242 is shown to have a combination actuator but could be key operated.

The kit 210 is constructed so that the panels 214, 216, 218, 222, 226 can be joined together without the need of any separate fasteners. Of course, some or all of the panels 214, 216, 218, 220, 222, 226 can be additionally secured to each other using separate fasteners, by welding, or the like.

The kit 210 utilizes locating posts 244 and cooperating locating slots 246 between certain of the cooperating panels 218, 220, 222, 226. Cooperating locating post 244 and slots 246 can be used elsewhere than shown. One exemplary connection between a locating post 244 and locating slot 246 is shown in FIGS. 6 and 9–11, between the rear panel 222 and the side panel 220.

The rear panel 222 has a flat wall 248 with a peripheral edge 250 that is orthogonal to the plane of the flat wall 248. The edge 250 is reversely bent to provide a continuous flange 252 that is spaced from, and substantially parallel to, the plane of the flat wall 248. In this embodiment, five of the locating slots 246 are located in vertically spaced relationship on a vertical side section 254 of the flange 252 for cooperating with a like number of locating posts 244 on the panel 220.

The panel 220 has a flat wall 256 with a peripheral edge 258 that is orthogonal to the plane of the flat wall 256. One vertical edge section 260 carries the locating posts 244 which cooperate, one each, with the locating slots 246.

Each locating post 244 consists of an enlarged head 262 having a cylindrical shape, and a reduced diameter neck 264, which has a cylindrical shape that is coaxial with the cylindrical head 262 and which spaces the head 262 from a flat surface 266 on the vertical edge section 260. The axial dimension of the neck 264, and thus the spacing of the head 262 from the surface 266, is selected to be slightly greater than the thickness T (FIG. 9) of the flange 252.

Each locating slot 246 has a keyhole shape consisting of a round portion 268 which is contiguous with a U-shaped portion 270. The diameter D of the round portion 268 is chosen to be slightly larger than the diameter D1 of the enlarged head 262 so that the enlarged head 262 can pass without resistance therethrough. The width W of the U-shaped portion 270 is chosen to be slightly greater than the diameter D2 of the neck 264 so that the neck 264 can be introduced to the round portion 268 and slid without resistance through the U-shaped portion to abut to a curved base edge 272 that has a diameter that is slightly larger than the diameter D2.

Accordingly, to interengage each locating post 244 and slot 246, the post 244 and slot 246 are preliminarily aligned in a first relative position as in FIG. 9, wherein the central axis C of the post 244 is coaxial with the central axis Cl of the round portion 268 of the slot 246. The panel 220 is moved in a first direction in a first line, as indicated by the arrow 273, i.e. horizontally, until the head 262 is passed fully through the slot 246 to allow the panel surface 266 to facially abut to an oppositely facing, flat surface 274 on the flange 252. Once this occurs, the panels 220, 222 can be relatively vertically shifted, as by shifting the panel 220 n the direction of the arrow 275, i.e. vertically, transversely to the line of the arrow 273, to cause the neck 264 to pass into and through the U-shaped portion 270 of the slot 246 into abutting relationship with the base edge 272. This represents the assembled position for the panels 220, 222.

In the assembled position, a surface 276 on the head 262 is facially presented to a flat surface 278 on the flange 252 which faces oppositely to the flange surface 274. With the panels 220,222 in the assembled state, a force that tends to withdraw the post 244 from the slot 246 along the line of the axes C, Cl causes the head surface 276 to abut the surface 278. The diameter of the surface 276 cannot pass through the U-shaped portion 270 and thus the panels 220, 222 in the assembled position are locked against separation by relative movement along the axes C, C1.

The five posts 244 and slots 246 are spaced so that they can be simultaneously engaged as by initially aligning the heads 262 with the round portions 268, advancing the panel 220 in the direction of the arrow 273 in FIG. 10 and thereafter effecting shifting between the panels 220, 222 in a transverse direction, as indicated by the arrow 275 to seat the necks 264 of the posts 244 against the base edges 272. It should be understood that any number of locating posts 244 and slots 246 can be utilized and that the number five shown is a design consideration.

Figure 6:
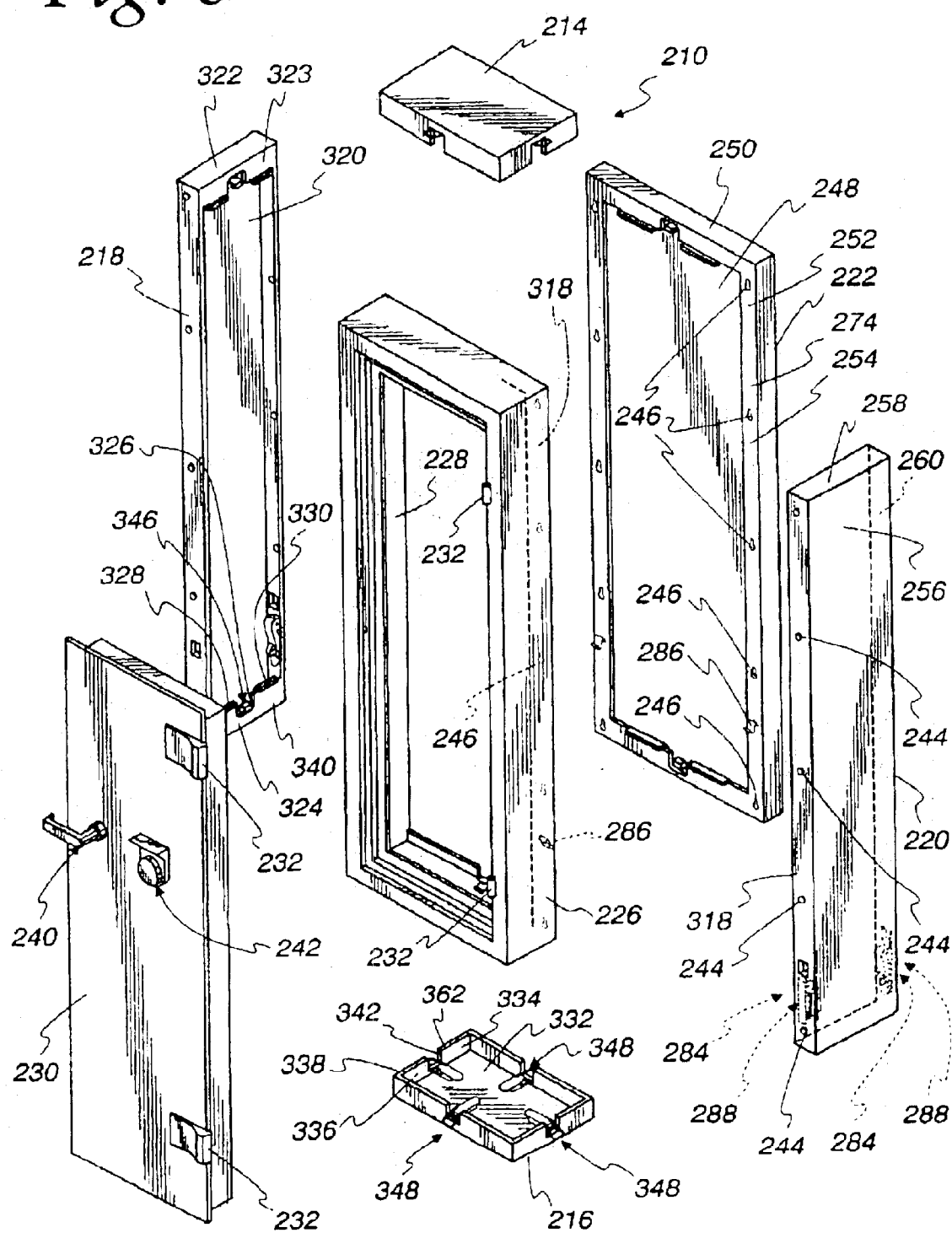
FIG. 6 is an exploded perspective view of a modified form of kit for a securable enclosure, according to the present invention, and including joinable panels.
Figure 8:
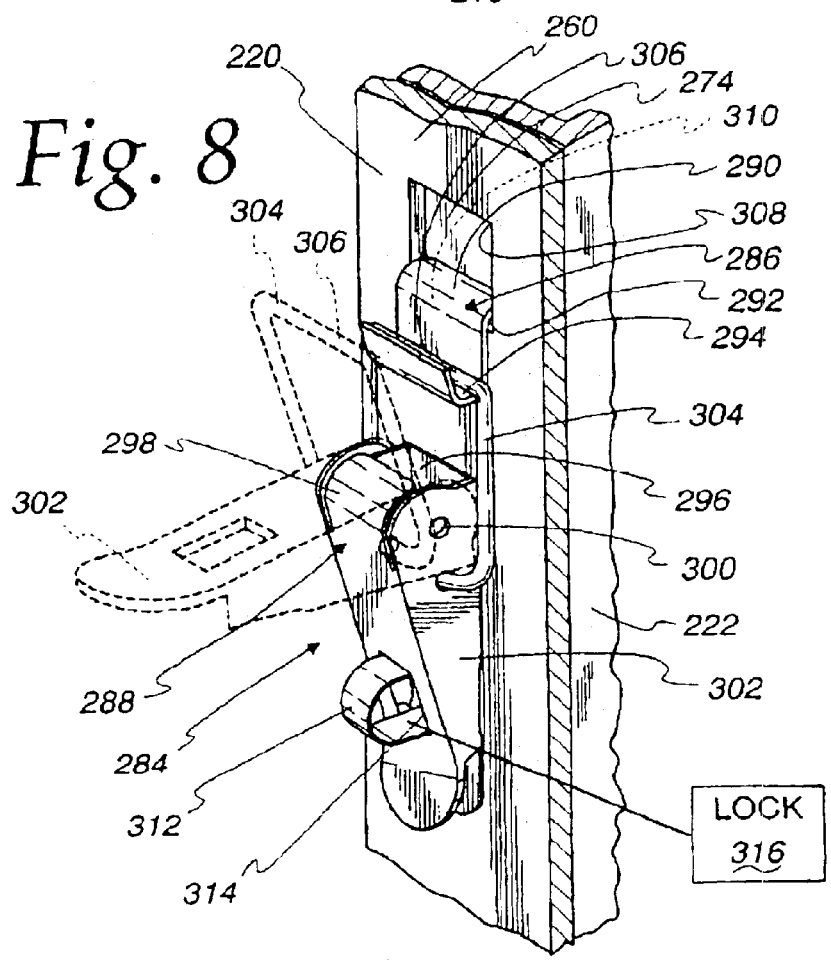
FIG. 8 is an enlarged, fragmentary, perspective view of a another form of connector assembly for maintaining panels in FIG. 6 together.

Relative vertical shifting between the panels 220,222, with the panels 220, 222 in the assembled position is precluded by the use of a connector assembly 284, shown in FIGS. 6 and 8, and also by the connected panels top and bottom 214, 216, as hereafter described. The connector assembly 284 functions similarly to each of the connector assemblies 102, previously described. The connector assembly 284 consists of cooperating first and second connector parts, 286, 288, respectively. The first connector part 286 consists of an S-shaped body 290 which is fixedly attached to project forwardly in cantilever fashion from the flange surface 274. The body 290 defines a downwardly opening, U-shaped seat 292 and an upwardly opening, U-shaped seat 294.

The second connector part 288 is fixedly attached to the vertical edge section through a U-shaped base element 296. The base element 296 supports a latch assembly 298 which is pivotable relative to the base element 296 about a hinge pin 300 between a latched position, as shown in solid lines in FIG. 8, and an unlatched position, shown in phantom lines in that same figure. The latch assembly 298 includes a U-shaped housing 302 which straddles the base element 296 and which is connected to the base element 296 through the hinge pin 300. A U-shaped lock hook/latch wire 304 is pivotably mounted to the housing 302. By pivoting the housing 302 from the phantom position to the solid line position, a cross bar 306 on the latch wire 304 is drawn closer to the base element 296. The housing 302 achieves an overcenter position to be maintained in the solid line position as the housing 302 is moved from the phantom position into the solid line position.

The second connector part 288 is mounted to the vertical edge section 260 adjacent to a square cut-out 308, which is dimensioned to allow passage of the first connector part 286 therethrough with the panels 220, 222 situated as in FIG. 10. As the panel parts 220, 222 are resituated from the FIG. 10 position into the FIG. 11 position, an upwardly facing edge 310 bounding the cut-out 308 nests in the U-shaped seat 292. In this position, the other seat 294 is situated to be engaged by the cross bar 306. As an incident of the connector assembly being changed from the phantom line, unlatched position into the solid line, latched position, a cross bar 306 bears against the edge 294 so as to draw the panel 222 downwardly relative to the panel 220, thereby tending to maintain the panels 220, 222 in their assembled state.

The base element 296 has a U-shaped element 312 which projects through a complementarily-shaped cut-out 314 in the latch assembly 298 with the latch assembly in the latched position. A lock 316, which may be a padlock, or the like, can be installed on the U-shaped element 312 to prohibit movement of the latch assembly out of the latched position, as to release the panels 220, 222 from each other.

The front frame panel 226 has a peripheral flange 318 with locating slots 246 and a first connector part 286 which cooperate with locating posts 244 and a second connector part 288 on a vertical section 318 of the peripheral edge 258 on the panel 220 in the same manner as the slots 246 and first connector part 286 on the flange section 254 cooperate with the locating posts 244 and second connector part 288 on the edge section 260, as described above.

Additionally, the side panel 218 can be constructed to be identical to the side panel 220 and is joined to the rear panel 222 and front frame panel 226 in the same manner that the side panel 220 is connected to the rear panel 222 and front frame panel 226.

With the side panels 218, 220, front frame panel 226, and rear panel 222 assembled, as described above, the top panel 214 and bottom panel 216 can be assembled. The top and bottom panels 214, 216 have the same construction and are assembled in the same manner. The assembly of representative bottom panel 216 only will be described. Further, the bottom panel 216 is connected to each of the side panels 218, 220, the rear panel 222, and the front frame panel 226 in the same manner. Accordingly, only a connection between the bottom panel 216 and the side panel 218 will be described as representative of the other connections.

Figure 7:
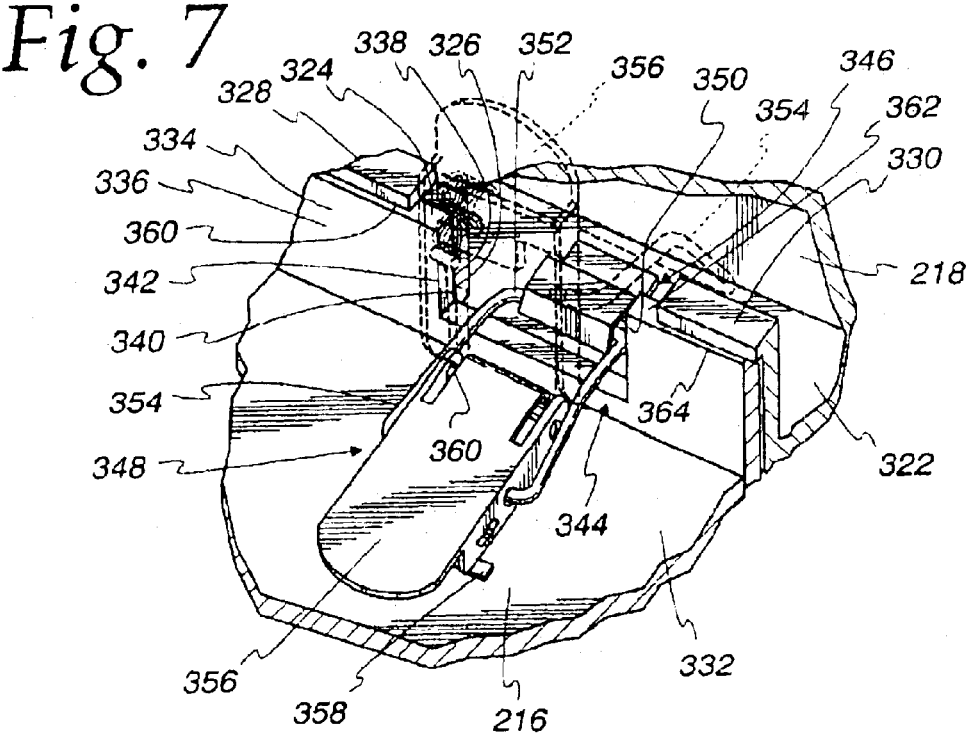
FIG. 7 is an enlarged, fragmentary, perspective view of a connector assembly used to maintain the panels in FIG. 6 together in assembled relationship.

Referring to FIGS. 6 and 7, the panel 218 has a flat wall 320. A peripheral edge 322 extends orthogonally from the plane of the flat wall 320 and is return bent at the top and bottom to define flanges 323, 324. The flange 324 has a cut-out 326. The flange 324 is bent to define two horizontally extending lips 328, 330 spaced on opposite sides of the cut-out 326.

The bottom panel 216 has a flat wall 332 with a peripheral edge 334 disposed at right angles to the plane of the flat wall 332. A horizontal section 336 of the edge 334 has a length corresponding to the length of the horizontal section 324 on the side panel 218. The flange 336 has a flat surface 338 which is facially abuttable to a flat surface 340 on the flange 324 with the panels 216, 218 in an assembled position. The horizontal section 336 has a cut-out 342 which is similarly configured to, and coincides with, the cut-out 326 in the panel 218. The cut-outs 326, 342 accommodate a connector assembly at 344.

The connector assembly 344 consists of a first connector part 346 attached fixedly to the peripheral edge 322, and a second connector part 348 attached to the flat wall 332 of the panel 216. The connector assembly 344 may have the same construction as the connector assemblies 102, previously described. The first connector part 346 has a body that defines a U-shaped seat 350 to be engaged by a cross bar 352 on a U-shaped lock hook/latch wire 354. The latch wire 354 is repositionable by a housing 356 which pivots relative to a base element 358 about a pin 360 between latched and unlatched positions, shown in solid and phantom lines in FIG. 7. The connector assembly 344 in the latched position draws the surfaces 338, 340 positively against each other to maintain the assembled state.

Relative positioning of the panels 316, 218 is facilitated by the lips 328,330. The lip 328 has a downwardly facing surface 360 which abuts to the free edge 362 of the peripheral edge 334 with the panels 216, 218 in the desired vertical relationship. Similarly, the lip 330 defines a surface 364 which also abuts to the edge 362.

The remainder of the panels 220, 222, 226 are configured, and provided with connector parts 346 to cooperate with connector parts 348 at three different locations on the bottom panel 216. As previously noted, the top panel 214 is connected to the panels 218, 220, 222, 226 in the same manner as the bottom panel 216 is connected to these same panels.

Accordingly, with the embodiment shown, the six panels 214, 216, 218, 220, 222, 226 can be stored and transported in a broken down state and placed in the assembled state without the need for any separate fasteners. To accomplish this, the side panels 218, 220 are connected to the rear panel 222 and front frame panel 226 as previously described, after which the top panel 214 and bottom panel 216 can be assembled using the connector assemblies 284, 344. The connector assemblies 284 prevent relative vertical shifting between the panels 218, 220, 222, 226. Relative vertical shifting is further prevented by the attached top panel 214 and bottom panel 216. All of the connector assemblies 284, 344 are accessible from the storage space 229 but become inaccessible once the closure element 230 is closed. If desired, with the closure element 230 opened, the enclosure 212 can be disassembled by reversing the assembly steps, previously described.

The reinforcing rod 192 can also be utilized in the embodiment shown in FIGS. 5–8 for extension between the panels 214, 216. The other structure, such as the alarm signal generator 186, etc. can be incorporated into the enclosure 212. Also, other components can be interexchanged so that a resulting enclosure has features of both embodiments described herein.

The foregoing disclosure of specific embodiments is intended to be illustrative of the broad concepts comprehended by the invention.

What is claimed is:

1. A securable enclosure, the securable enclosure having a front opening, said securable enclosure comprising:
   a top panel;
   first and second side panels;
   a rear panel,
   the top panel, first and second side panels, and rear panel being connected to each other with the securable enclosure in an assembled state to bound a storage space accessible through the front opening;
   a first connector part fixedly attached to one of the top panel, first side panel, second side panel, and rear panel;
   a second connector part fixedly attached to another one of the top panel, first side panel, second side panel, and rear panel,
   the first and second connector parts releasably connected, each to the other, without requiring any additional separate parts to maintain the one and the another of the top panel, first side panel, second side panel, and rear panel together with the securable enclosure in the assembled state,
   wherein the first and second connector parts are connectable and releasable from each other by accessing and repositioning at least one of the first and second connector parts from within the storage space by repositioning at least a part of the at least one of the first and second connector parts relative to the one or the another of the top panel, first side panel, second side panel, and rear panel to which the at least one of the first and second connector parts is fixedly attached, with the securable enclosure in the assembled state,
   wherein the one and the another of the top panel, first side panel, second side panel, and rear panel are fixed together so that the one and the another of the top panel, first side panel, second side panel and rear panel are angled with respect to each other to define an inside corner and an outside corner, and the first and second connector parts are mounted at the inside corner so as to be accessible only through the front opening with the securable enclosure in an assembled state; and
   a lockable closure element which is movable between open and closed positions,
   wherein the one of the top panel, first side panel, second side panel, and rear panel has a substantially flat first surface and a first flange with a flat surface that is angularly disposed to the first surface,
   wherein the another of the top panel, first side panel, second side panel and rear panel has a substantially flat second surface and a second flange with a flat surface that is angularly disposed to the second surface,
   wherein with the securable enclosure in the assembled state, the flat surface on the first flange is facially abutted to the flat surface on the second flange,
   wherein at least one of the first and second connector parts extends fully through the first flange to connect to the other of the first and second connector parts,
   wherein the first and second flanges each have an opening therethrough to accommodate the first and second connector parts and at least one of the first and second connector parts is spaced from the flange on the panel on which the at least one of the first and second connector Darts is located.

2. The securable enclosure according to claim 1 wherein the first connector part comprises a clip body and the second connector part comprises a repositionable lock hook that is releasably connectable to the clip body, the another of the top panel, first side panel, second side panel, and rear panel having a substantially flat surface to which the second connector part is mounted, the flat surface residing in a reference plane, the repositionable lock hook is pivotably attached to a housing and the housing is pivotable relative to the another of the top panel, first side panel, second side panel, and rear panel about an axis that is substantially parallel to the reference plane between a) a first position wherein the repositionable lock hook can be connected to the clip body and b) a second position wherein the repositionable lock hook is urged so as to biasably urge the one and the another of the top panel, first side panel, second side panel, and rear panel against each other.

3. The securable enclosure according to claim 2 wherein the lock hook is accessible for movement thereof only from within the storage space with the securable enclosure in the assembled state.

4. The securable enclosure according to claim 1 wherein the top panel is releasably connected to each of the first and second side panels and rear panel through at least first and second pairs of releasable cooperating connector parts with the connector parts in the first pair of cooperating connector parts provided one each on a) the top panel and b)one of the first side panel, second side panel, and rear panel, the connector parts in the second pair of cooperating connector parts provided one each on c) the top panel and another one of the first side panel, second side panel, and rear panel, the connector parts on the at least first and second pairs of releasable cooperating connector parts being connected, each to the other, without requiring any additional separate parts or repositioning of the panels to which the first and second pairs of releasable connector parts are connected.

5. The securable enclosure according to claim 1 wherein the securable enclosure further comprises a front frame panel for a closure element and the front frame panel is releasably connected to at least one of the top panel, first side panel, and second side panel through at least first and second pairs of releasable cooperating connector parts the connector parts in the first pair of cooperating connector parts provided one each on a) the front frame panel and b) one of the top panel, first side panel, and second side panel, the connector parts in the second pair of cooperating connector parts provided one each on c) the front panel and another one of the top panel, first side panel, and second side panel, the connector parts in the at least first and second pairs of releasable cooperating connector parts being connected, each to the other, without requiring any additional separate parts or repositioning of the panels to which the first and second pairs of releasable connector parts are connected.

6. The securable enclosure according to claim 1 further comprising a bottom panel which is releasably connected to at least one of the first side panel, second side panel, and rear panel.

7. The securable enclosure according to claim 6 wherein the bottom panel is releasably connected to the at least one of the first side panel, second side panel, and rear panel through releasable cooperating connector parts with one of the cooperating connector parts being attached to the bottom panel and another of the connector parts being attached to the at least one of the first side panel, second side panel, and rear panel.

8. The securable enclosure according to claim 1 wherein the securable enclosure further comprises a bottom panel and a reinforcing rod that extends between the top panel and the bottom panel, the reinforcing rod being spaced from each of the first and second side panels and the rear panel.

9. The securable enclosure according to claim 1 wherein the first surface is substantially orthogonal to the second surface.

10. The securable enclosure according to claim 1 wherein the first and second connector parts biasably draw the flat surfaces on the first and second flanges against each other.

11. The securable enclosure according to claim 1 wherein the first and second connector parts are releasably, biasably held connected to each other.

12. The securable enclosure according to claim 1 wherein the first and second connector parts define a connector assembly, wherein the securable enclosure comprises a plurality of connector assemblies including at least one connector assembly that acts between each of a) the top panel and at least one of the first side panel, second side panel, and rear panel, b) the first side panel and at least one of the top panel and the rear panel, c) the second side panel and at least one of the top panel and the rear panel, and d) the rear panel and at least one of the top panel, the first side panel, and the second side panel.

13. The securable enclosure according to claim 12 wherein the plurality of connector assemblies maintain the top panel, first and second side panels, and rear panel together with the securable enclosure in the assembled state without requiring any separate fasteners or repositioning of the panels to which the first and second pairs of releasable connector parts are connected.

14. The securable enclosure according to claim 1 wherein a first of the top panel, first side panel, second side panel, and rear panel has a locating post thereon, and another of the top panel, first side panel, second side panel, and rear panel has a locating slot thereon which receives the locating post with the securable enclosure in the assembled state.

15. The securable enclosure according to claim 14 wherein the locating post is fixed on the first panel.

16. The securable enclosure according to claim 15 wherein the locating post comprises a neck with an enlarged head on the neck, the enlarged head is moved into the locating slot by moving the first panel in a first direction in a first line with the first and another panels in a first relative position, and the slot is configured so that with the enlarged head moved through the slot, shifting of the first panel relative to the another panel transverse to the first line to a second relative position causes the enlarged head to act against the another panel to thereby block movement of the enlarged head out of the slot by movement of the first panel parallel to the first line oppositely to the first direction.

17. The securable enclosure according to claim 16 further comprising a third connector part on the first panel and a fourth connector part on the another panel, the third and fourth connector parts being releasably connectable, each to the other to maintain the first and another panels in the second relative position.

* * * * *